United States Patent

Kemmetmueller

[15] 3,645,515
[45] Feb. 29, 1972

[54] METALLURGICAL FURNACE INSTALLATION AND OPERATING METHOD

[72] Inventor: Roland Kemmetmueller, Pittsburgh, Pa.
[73] Assignee: American Waagner-Biro Company, Inc., Pittsburgh, Pa.
[22] Filed: Oct. 12, 1970
[21] Appl. No.: 79,821

[52] U.S. Cl. .................................................. 263/32, 263/36
[51] Int. Cl. ................................................................ F27b 7/02
[58] Field of Search ........................ 263/29, 32, 36; 266/31

[56] References Cited

UNITED STATES PATENTS

| | | | |
|---|---|---|---|
| 3,472,500 | 10/1969 | Rinesch et al. | 266/31 X |
| 3,320,931 | 5/1967 | Durham | 266/31 X |

FOREIGN PATENTS OR APPLICATIONS

| | | | |
|---|---|---|---|
| 575,174 | 4/1933 | Germany | 263/36 |

Primary Examiner—John J. Camby
Attorney—Steinberg & Blake

[57] ABSTRACT

A metallurgical furnace installation and method for operating the metallurgical furnace installation. The installation includes a vessel in which metallurgical operations are carried out with development of waste gas which flows out of the vessel. A waste gas cooler receives the waste gas from the vessel. Certain materials, such as scrap, limestone, dolomite, and the like, are generally used as at least part of the charge for the vessel and must be pretreated as by being heated to a suitable temperature and provided with certain desired characteristics by exposure to a given gaseous atmosphere. These materials are directed through the waste gas cooler to be treated directly by the waste gas therein. Thus, the waste gas itself is used for the pretreatment of materials which form at least part of the charge, with this pretreatment being carried out according to the temperature and/or composition of the waste gas. A suitable supply supplies the material to the interior of the waste gas cooler to be exposed to the waste gas therein, and then the treated material is removed by a discharge device from the interior of the waste gas cooler to be utilized in the vessel of the furnace installation.

36 Claims, 7 Drawing Figures

Patented Feb. 29, 1972

INVENTOR.
ROLAND KEMMETMUELLER

BY
Steinberg and Blake
ATTORNEYS

INVENTOR.
ROLAND KEMMETMUELLER

BY Steinberg and Blake
ATTORNEYS

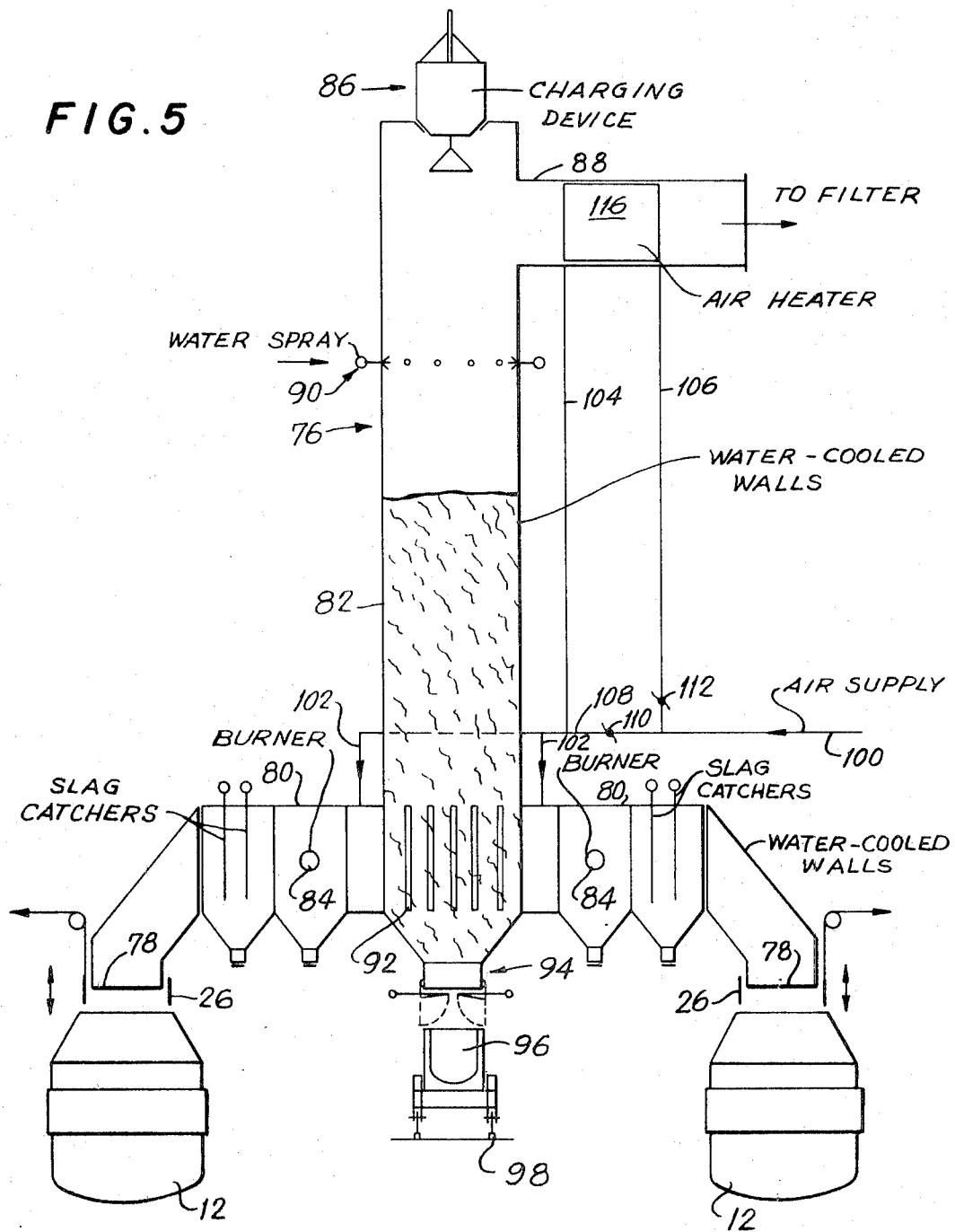

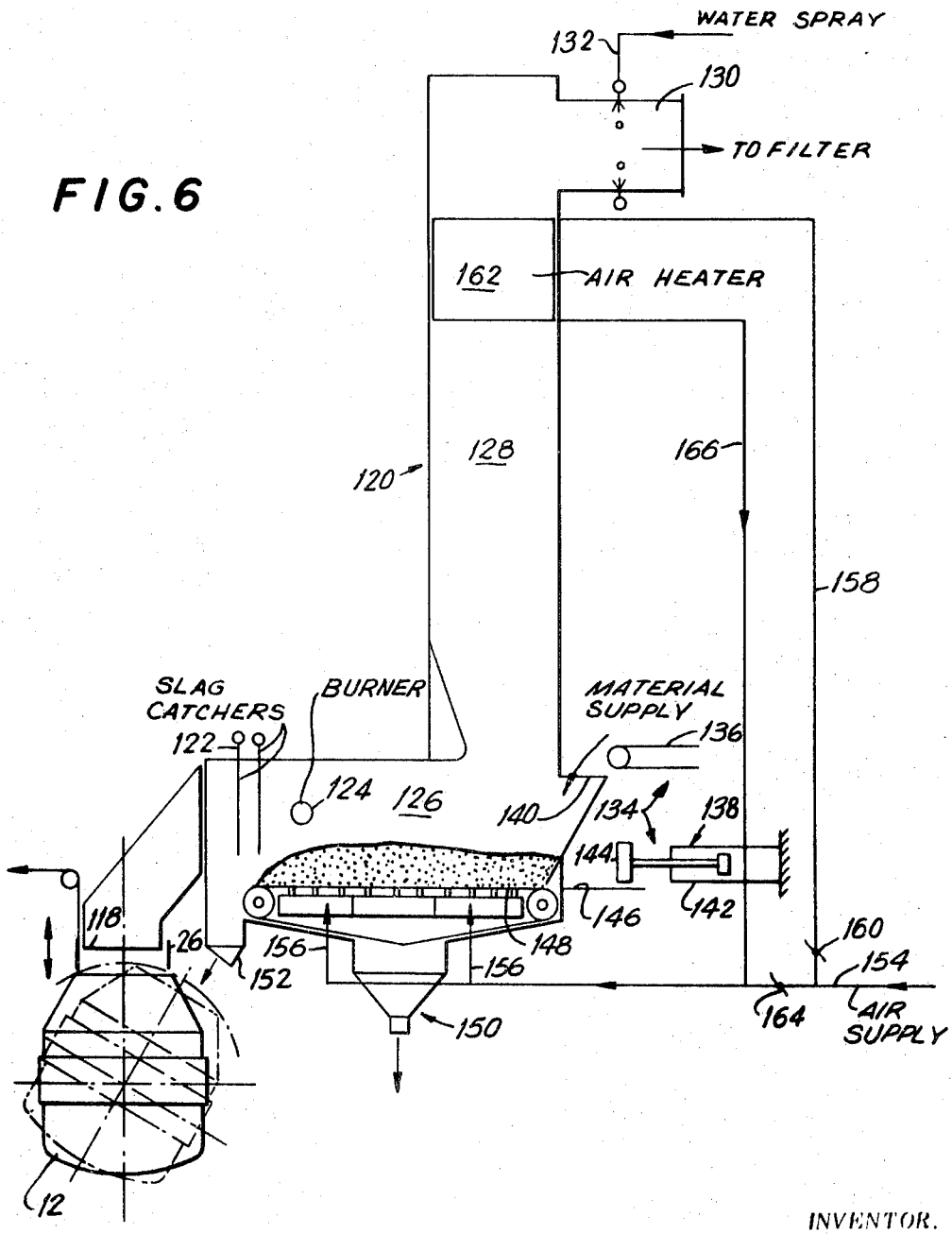

METALLURGICAL FURNACE INSTALLATION AND OPERATING METHOD

BACKGROUND OF THE INVENTION

The present invention relates to metallurgy.

In particular, the present invention relates to metallurgical furnace installations and to methods of operating such installations.

As is well known, in the manufacture of steel, for example, a suitable charge is treated in a vessel such as a BOF converter. Similar treatments may be carried out in other types of furnaces such as electric furnaces, open hearth furnaces, and the like.

The vessels of such furnaces receive a charge which is required to include certain materials such as metallic scrap, lime, and other particulate forms of suitable constituents which promote the required metallurgical treatment.

Experience has shown that considerable advantage is to be derived from pretreating these materials before they are added to the charge. For example, if such materials are preheated, the metallurgical operation is enhanced considerably by reducing the amount of heat which must be generated within the vessel itself for the purpose of bringing the constituents of the charge to the required temperature. Also, it is often of advantage to provide certain chemical treatments to the charge components prior to addition thereof to the charge, for enhancing the metallurgical operations.

At the present time the costs involved in the operation of installations of the above type are determined to a considerable extent by the operations carried out in connection with pretreatment of the materials which contribute to the information of the charge. Thus, while it is still of advantage to pretreat certain constituents which form part of the charge, as contrasted with the use of untreated constituents directly in the charge, nevertheless the costs involved are undesirably high. These costs result not only from labor costs but also from the requirement of extra expensive equipment which occupies an undesirably large amount of space and which includes not only the equipment for treating the charge constituents but also equipment for transporting these constituents to and from the pretreating installations.

SUMMARY OF THE INVENTION

It is accordingly a primary object of the present invention to provide a method and apparatus for greatly reducing the costs involved in pretreatment of constituents used in the charge for furnaces of the above type.

In particular it is an object of the present invention to provide a method and apparatus which make use of the properties of the waste gas itself for pretreating the constituents which are used in the charge.

Also it is an object of the present invention to provide a method and apparatus which, as contrasted with conventional methods and apparatus for achieving similar purposes, require an extremely small amount of labor and equipment.

A further object of the present invention is to provide an apparatus of the above general type which is exceedingly compact and occupies very little space beyond that which is normally occupied by the installation without the pretreating structure.

Yet another object of the present invention is to provide a method and apparatus which enables extremely precise controls to be achieved for providing pretreated constituents whose properties can be precisely regulated.

Furthermore, it is an object of the present invention to provide a method and apparatus which enable the rate of supply of the constituents to be added to the charge to be synchronized with the furnace operation so that exactly the right amount of materials to be added to the charge are ready at the moment required for addition to the charge, without creating problems of an oversupply of the constituents which must be maintained in readiness to be added to the charge as well as without creating the problem of an insufficient amount of these constituents available for use when required in the charge.

The objects of the present invention also include the provision of a method and apparatus which make use of practically all of the energy available in the waste gas for reducing in this way the amount of power which otherwise would be required.

Also, the objects of the present invention include the provision of a method and apparatus which in addition to utilizing the waste gas itself for the pretreatment of constituents to be added to the charge also functions to provide for the waste gas a very favorable condition for handling thereof as it flows through and beyond a waste gas cooler.

According to the method of the invention, a metallurgical furnace which has a waste gas cooler is operated while directing selected material through the waste gas cooler to be treated by the gas therein, this treated material then being utilized as part of the charge of the furnace. Thus, the apparatus of the invention includes a vessel in which metallurgical operations are carried out, a waste gas cooling means communicating with this vessel to receive waste gas therefrom. A supply means communicates with the waste gas cooling means for supplying to the interior thereof material to be subsequently used in the charge and to be pretreated by the waste gas which flows through the cooling means. A discharge means also communicates with the cooling means for receiving the materials treated by the waste gas so that these materials can then be used in the charge.

BRIEF DESCRIPTION OF DRAWINGS

The invention is illustrated by way of example in the accompanying drawings which form part of this application and in which:

FIG. 5 is a schematic elevation of a further embodiment of a method and apparatus according to the invention;

FIG. 6 is a schematic illustration of a still further embodiment of the method and apparatus of the invention.

DESCRIPTION OF PREFERRED EMBODIMENTS

Figure 1:
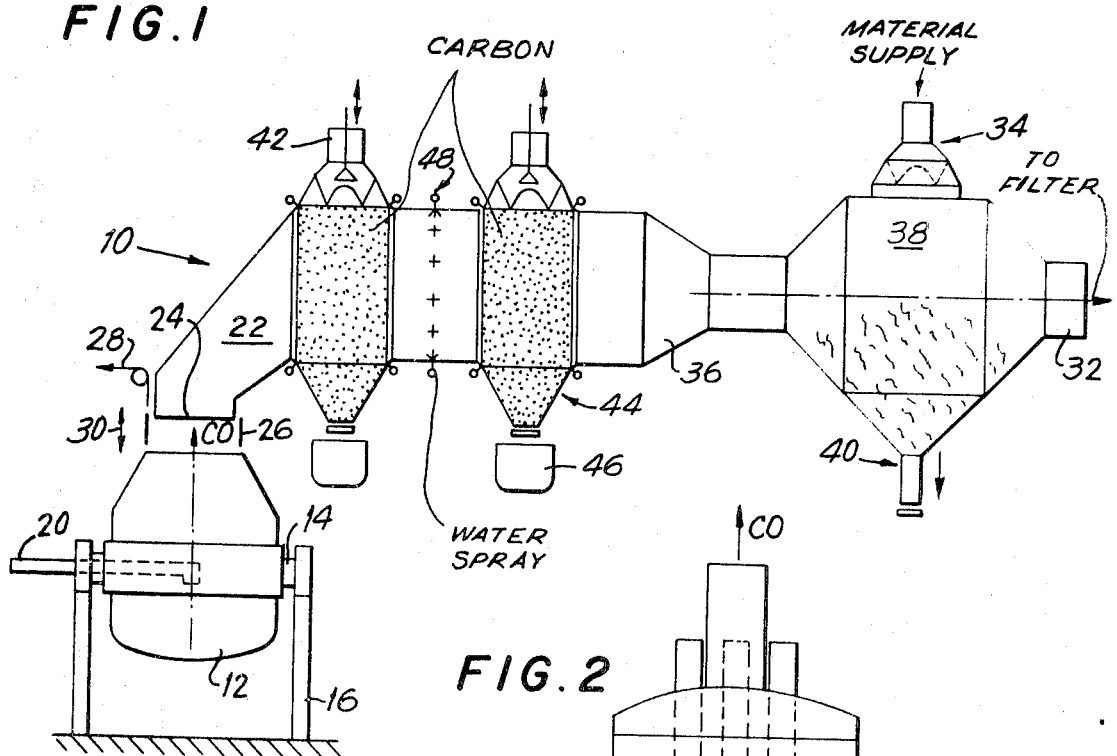
FIG. 1 is a schematic elevation of one embodiment of an apparatus and method according to the invention.

Referring first to FIG. 1, the installation 10 illustrated therein is a metallurgical furnace installation for carrying out metallurgical operations. Thus the illustrated installation includes a vessel 12 in the form of a BOF converter which is of conventional construction and which is supported on trunnions 14 carried by suitable standards 16 so that the vessel 12 can tilt about the horizontal axis 18. As is well known the vessel will be tilted between the operating position illustrated in FIG. 1 and a position for receiving a charge as well as a position for discharging the materials within the vessel after proper treatment thereof. FIG. 1 schematically represents a horizontal oxygen lance 20 extending through the left bearing of FIG. 1 into the interior of the vessel for providing oxygen during the blow periods when the furnace operates.

A waste gas cooling means 22 has a receiving end 24 which communicates with the furnace vessel 12 for receiving therefrom the waste gas which includes carbon monoxide, as indicated schematically in FIG. 1. This receiving end 24 of the cooling means 22, which forms the waste gas cooler, is located extremely close to and in fact directly next to the vessel 12 so as to minimize heat losses so as to control the combustion air consequently the waste gas properties according to the requirements of the material to be dealt with at the location wherein the cooling means 22 and vessel 12 communicate with each other. For this purpose a closure ring 26 is provided. This closure ring 26 forms an extension of the receiving end 24 of the cooling means 22 and may be raised and lowered by any suitable mechanism 28 as schematically illustrated in FIG. 1 and as is indicated by the double-headed arrow 30. Thus, when the closure ring 26 is lowered to its closing position the heat losses will be at an absolute minimum, and of course through the mechanism 28 it is possible to raise the closure ring 26 in order to release the vessel 12 for tilting movement.

The cooling means 22 is in general of a well-known construction according to which its walls are made up of tubes through which a fluid flows to extract heat from the waste gas. Thus, this cooling means forms a well-known boiler construction for deriving steam, for example, from the energy in the waste gas. The waste gas normally flows through the cooling means beyond the portion 32 thereof to be received at a filter before discharging to the outer atmosphere through a suitable stack.

As is well known, the constituents of the charge which is treated within the vessel 12 include scrap metal, limestone, dolomite, or other processing components in particulate form. If these materials were simply introduced at room temperature without any pretreatment into the vessel 12, then considerable amount of time and energy loss would be involved simply in raising the constituents of the charge to the required temperature. Therefore it has been proposed to pretreat the constituents added to the charge as by preheating them and exposing them to suitable atmospheres or fluids which will provide for the constituents properties which will enable the operations within the vessel 12 to be carried out in the best possible way, as well as in a minimum time and with a minimum consumption of power. In accordance with the invention the pretreatment of these constituents is carried out in the cooling means 22 by taking advantage of the properties of the waste gas itself. Thus it is the waste gas itself which is used to pretreat the constituents which are to be added to the charge.

Referring to FIG. 1, there is illustrated therein a supply means 34 through which the material to be subsequently used in the charge is supplied into the interior of the cooling means 22 to be treated by the waste gas therein. The supply means 34 which communicates with the interior of the cooling means 22 at an upper portion thereof may be of any well known construction according to which from a suitable hopper the particulate materials flow downwardly over a valve or closure member which can be raised or lowered to a given extent so as to control the rate of flow of the material through the supply means 34 into the waste gas cooling means 22. Thus, with this method and apparatus of the invention while the waste gas flows substantially horizontally toward the right, as viewed in FIG. 1, through the Venturi-shaped portion 36 of the cooling means 22, this waste gas will reach the treating portion 38 down which the material supplied through the supply means 34 fall by gravity so that as the result of this transverse flow of the material through the waste gas the material will be heated and otherwise treated to be provided with properties desirable for these materials when they are added to the charge.

A discharge means 40 communicates with the waste gas cooling means 22 just beneath the supply means 34 in order to receive the treated material. This discharge means 40 may be in the form of a tubular outlet having a closure member which can be opened and closed as desired. Beneath the discharge means 40 there may be a car, for example, which rides on suitable tracks and which receives the materials when the discharge means 40 is opened, so that the materials can then be immediately delivered to the vessel 12 to be used in the charge thereof. The rate of supply of the materials by the supply means 34 is such that at the discharge means 40 it is possible to obtain an amount of pretreated materials in condition for addition to the charge exactly equal to the amount required during operation of the furnace.

For certain purposes it is highly desirable to expose the treated materials to the waste gas not only to be preheated by the temperature thereof but also to be chemically treated by being exposed to an atmosphere which is rich in carbon monoxide. As is schematically indicated in FIG. 1, the waste gas flowing out of the vessel 12 has carbon monoxide. However in some cases this waste gas may be relatively poor in carbon monoxide so that an enrichment thereof to increase the carbon monoxide content is desirable. For this purpose it is possible to add to the interior of the cooler 22 upstream of the portion 38 where the charge constituents are treated a carbonaceous material which will increase the carbon monoxide content of the gas to which the treated materials are exposed.

FIG. 1 illustrates a pair of additional supply means 42, which may be identical with the supply means 34, and through which carbonaceous particulate material, such as coke or coal, is supplied at a selected rate according to the settings of the adjustable supply means 42. This carbonaceous particulate material will flow down through the waste gas cooling means across the horizontal direction of flow of the waste gas, to react within the cooling means to enrich the carbon monoxide content of the waste gas. A pair of discharge means 44 are respectively provided beneath the pair of additional supply means 42, and this pair of discharge means 44 can be selectively opened at selected intervals for depositing into the schematically represented cars 46 the ashes which remain from the carbonaceous material after it has passed downwardly through the waste gas. These cars 46 may be identical with the car which receives the treated charge constituents from the discharge means 40, but of course the tracks on which the cars 46 ride will deliver them to locations where the ashes are to be received. Furthermore, it is often desirable to reduce the temperature of the waste gas. Thus in the case as illustrated in FIG. 1, the introduction of the carbonaceous material will increase the temperature of the waste gas beyond that which is desired for preheating of the charge constituents treated in the portion 38 of the cooling means 22. Furthermore, by the time the waste gas reaches the filter it should have a temperature low enough to provide for the waste gas a condition suitable for cleaning. For these reasons a cooling means is included for cooling the waste gas, and in the illustrated example this cooling means 48 takes the form of a plurality of spray nozzles distributed around and communicating with the interior of the cooling means between the portions thereof which receive the carbonaceous material. This cooling means 48 communicates with any suitable supply of cooling water so that the cooling water is sprayed into the interior of the cooling means for reducing the temperature of the waste gas therein.

Figure 2:
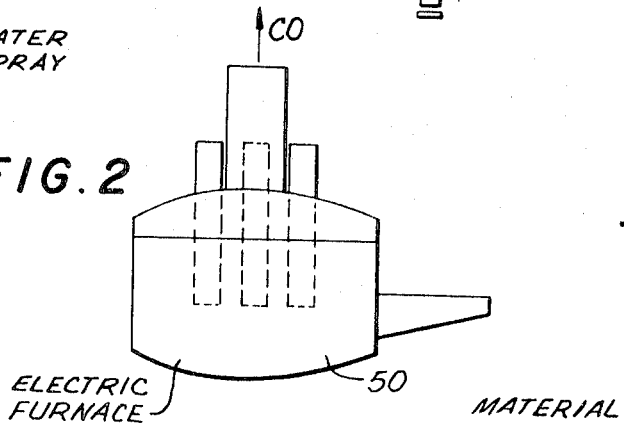
FIG. 2 is a schematic representation of an electric furnace which may be used with the installation of FIG. 1.

It is to be emphasized that the invention does not require a BOF furnace which includes a vessel 12. The invention is equally applicable to electric furnaces, open hearth furnaces, or any other type of furnace wherein metallurgical operations are carried out with development of a waste gas which is used for pretreating materials to be used in the charge of the furnace itself. Thus, FIG. 2 schematically represents an electric furnace 50 which may replace the vessel 12 and in which a suitable charge is treated while developing waste gas which will also flow into the waste gas cooling means 22 in the manner described above.

Figure 3:
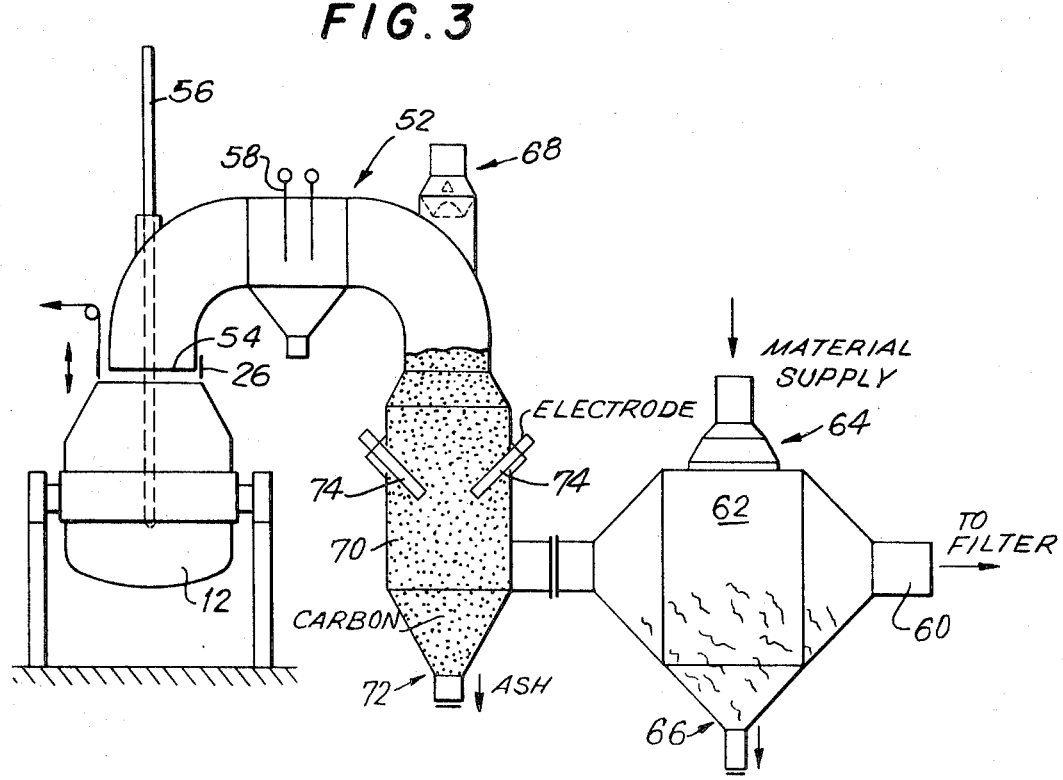
FIG. 3 is a schematic elevation of another embodiment of a method and apparatus according to the invention.

For certain operations it may be desirable to heat the carbonaceous material which is added to the interior of the cooling means for increasing the carbon monoxide content of the waste gas therein. FIG. 3 shows an embodiment of the invention which can accomplish this result. Thus, referring to FIG. 3 it will be seen that the installation illustrated therein includes a vessel 12 identical with that of FIG. 1 and communicating with a waste gas cooling means 52 which functions in substantially the same manner as the waste gas cooling means 22 although it has a somewhat different configuration, as illustrated in FIG. 3. The receiving end 54 of the cooling means 22 communicates with the upper open end of the vessel 12 in the same way as described above in connection with FIG. 1, and a vertically movable closure ring 26 identical with that of FIG. 1 is provided also in the embodiment of FIG. 3. However, it will be noted that in FIG. 3 use is made of a vertical oxygen lance 56 rather than the horizontal oxygen lance 20 of FIG. 1. FIG. 3 also schematically represents slag catchers 58 which are well known and which may also be included in the embodiment of FIG. 1.

The waste gas in FIG. 3 will flow through and beyond the portion 60 of the cooling means 52 in order to reach a filter in the same way as described above in connection with FIG. 1. This embodiment has the portion 62 in which the constituents to be used in the charge are pretreated. Thus, this embodiment also includes a supply means 64 which may be identical with the supply means 34 and a discharge means 66 which may be identical with the discharge means 40 so that the materials added through the supply means 64 will flow downwardly by gravity to be received at the discharge means 66 from where they are taken as required for use in the change delivered to the furnace 12.

With the embodiment of FIG. 3 there is also situated upstream of the portion 62 of the cooling means 52 a second supply means 68 for supplying to the interior of the waste gas cooling means a carbonaceous material in particulate form such as the coke 70 schematically represented in FIG. 3. This carbonaceous material will thus increase the carbon monoxide content of the waste gas in a manner described above in connection with FIG. 1, and thus since the carbonaceous material is introduced into the waste gas upstream of the portion 62, the waste gas is in a carbon-monoxide-enriched state when reaching the material introduced through the supply means 64. The ashes are collected at a discharge means 72 in precisely the same way as described above in connection with the pair of discharge means 44 of FIG. 1.

In order to heat the carbonaceous material 70, a pair of electrodes 74 are provided as schematically represented in FIG. 3. These electrodes communicate with any suitable source of electrical energy and form heating elements which act on the carbonaceous material to increase temperature thereof so as to enhance the reaction within the cooling means 52.

Figure 4:
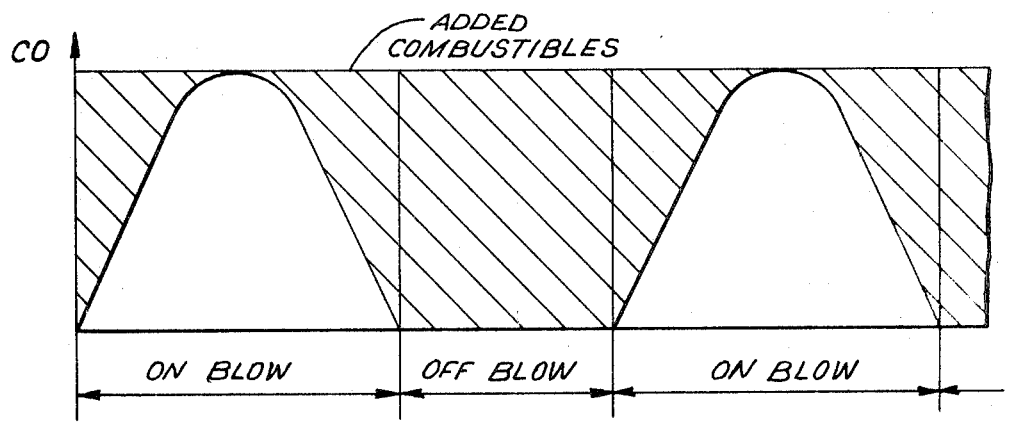
FIG. 4 is a graph representing the manner in which combustibles are added to the waste gas for maintaining predetermined properties therein during intermittent furnace operation.

With installations of the type shown in FIGS. 1 and 3, the furnaces operate intermittently so that they have periods of operation during which the waste gas flows through the cooling means from the vessel 12 which alternate with nonoperating periods when a new charge is placed within the vessel 12. Thus, the on blow periods will alternate with the off blow periods, as schematically represented in the graph of FIG. 4. Thus, during each on blow period of operation illustrated in FIG. 4 the waste gas represented by the carbon monoxide designation at the ordinate of the graph will start to form, with a peak flow being reached after which the rate of flow diminishes toward the end of the on blow period, and then an off blow period will take place during which the charge is replenished. With such intermittent operation there will of course be undesirable fluctuations in the flow and properties of the waste gas. In order to avoid excessive and undesirable controls at the supply means 34 or 64, it is desirable to provide an arrangement where the constituents to be added to the charge after pretreatment by the waste gas are supplied continuously at a predetermined rate to flow continuously through the waste gas to be treated thereby. This will of course require maintenance of the waste gas in a predetermined condition during periods when the furnace does not operate as well as during the periods when it does operate. For this purpose, as is indicated in FIG. 4, combustible materials are added to the waste gas in the interior of the cooling means in the manner represented by the shaded area of FIG. 4, so as to maintain the temperature and other properties of the waste gas substantially constant even though the furnace operates intermittently. These combustible materials added to the waste gas for maintaining the later at a predetermined temperature with predetermined properties which remain substantially constant may be in the form of the coke or coal referred to above in connection with FIGS. 1 and 3, although it is possible also to use for this purpose oil or even suitable combustible gases which are added either alone or in combination with other combustibles such as the oil or particulate carbonaceous material. Thus, these are examples of combustibles which are added at a rate indicated by the shaded area of the graph of FIG. 4, so as to maintain the properties of the waste gas substantially constant even though the furnace operates intermittently.

Referring now to FIG. 5, the embodiment of the invention which is illustrated therein has a single waste gas cooling means 76 communicating with a pair of vessels 12 of the illustrated installation. This single cooling means 76 has a pair of receiving ends 78 corresponding to the ends 24 and 54 of the embodiments of FIGS. 1 and 3 and also having movable extensions formed by closure rings 26 which can be raised and lowered in the manner described above. Thus, with this embodiment the single waste gas cooling means 76 can receive waste gas first from one vessel 12 and then from the other vessel 12, with these vessels being alternately operated so that while one vessel is not operating and is at an off blow stage the other vessel is operating and is at the on blow stage. Thus the requirement of adding combustibles in the manner shown in FIG. 4 is greatly reduced and in fact may be eliminated with the embodiment of FIG. 5.

The single waste gas cooling means 76 of FIG. 5 has a pair of identical branches 80 respectively communicating with the vessels 12 and branching from a common elongated vertical portion 82. These portions 80 and 82 are of course in the form of water-cooled walls made up of tubes through which fluid flows to extract heat from the waste gas as described above in connection with the other embodiments. FIG. 5 schematically illustrates the slag catchers and provides also additional burners 84 which may be utilized if desired in the other embodiments for the purpose of maintaining the waste gas at a predetermined condition both with respect to temperature and its other properties. The elongated portion 82 is provided at its top end with a supply means 86 for supplying to the interior of the cooling means 76 the materials to be pretreated by the waste gas so as to be subsequently used as part of the charge. The materials will flow downwardly in countercurrent to the upwardly flowing waste gas which flows up through the vertical portion 82 and then laterally through a branch 88 before reaching the filter. A water spray means 90 is also included in this embodiment and may have the same construction as the cooling means 48 of FIG. 1 for the purpose of cooling the waste gas so that it will have a temperature suitable for cleaning.

The downwardly flowing particulate material which is supplied by the supply means 86 at a predetermined rate is guided by way of baffles 92 to a discharge means 94 having suitable doors as schematically represented in FIG. 5 for the purpose of discharging the pretreated material to a car 96 which rides on the tracks 98 so that the pretreated material can be immediately delivered to one or the other of the vessels 12 to form part of the charge thereof.

In order to intensify the generation of heat at the portion of the waste gas cooling means where the charge constituents are pretreated, it may be desirable to add hot air to this region of the cooling means. FIG. 5 illustrates a structure and method of the invention which will include such a feature. Thus, an air supply means 100 receives air from any suitable source such as from a suitable compressor, and suitable valves may be provided along the conduit 100 to control the flow of air to the left, as viewed in FIG. 5, the air being delivered through the outlets 102 of the conduit 100 directly into the waste gas cooling means just ahead of the portion 82 thereof in which the pretreatment takes place. These outlets 102 may be alternately opened and closed so that when the left vessel 12 is on blow the left outlet 102 is open while the other is closed, with the right outlet 102 being open during the operating periods of the right vessel 12. Thus the hot air will be delivered through one or the other of the outlets 102 into the waste gas cooling means into the stream of waste gas flowing from whichever one of the vessels happens to be operating. Although the air supplied through the supply means 100 can be heated by an outside source of heat, according to a further feature of the invention the heat of the waste gas itself may be used for raising the temperature of the air supplied by the supply means 100. For this purpose the conduit 100 has branches 104 and 106 interconnected by a portion 108 of the supply means 100. This portion 108 is provided with a suitable valve 110. Also the branch 106 has a valve 112. These branches 104 and 106 communicate with an air preheater 116 which in effect forms a heat exchanger directing the air through a suitable conduit situated within the cooling means 76 to extract heat therefrom and thus heat the air so that it will have the required temperature when delivered through one or the other of the outlets 102 into the waste gas cooling means 76. Thus, by closing the valve 110 and opening the valve 112 the air will flow through the branch 106 to the preheater 116 to extract heat from the waste gas and then to flow through the branch 104 to one or the other of the outlets 102. On the other hand it is possible to close the valve 112 and open the valve 110 so that the air can flow directly to the outlet 102 without going through the preheater 116.

Also it is to be noted that a branch such as the branch 104 may have through a connecting conduit and a suitable valve communication with the interior of the waste gas cooling means for recirculating part of the waste gas itself, so that with such an arrangement the waste gas can also be continuously recirculated, at least in part, for enhancing the treatment of the materials to be added to the charge.

While in the embodiments of the invention described above the materials to be pretreated prior to being added to the charge all flow by gravity downwardly through the waste gas, this type of operation is not at all required. Thus, in the embodiment of FIG. 6 the material to be treated will be conveyed horizontally, in countercurrent to the horizontally flowing waste gas. Thus, referring to FIG. 6, it will be seen that in this case also the vessel 12 communicates with the receiving end 118 of a waste gas cooling means 120 formed also of tubular cooling walls. The end 118 has an extension formed by the vertically movable closure ring 26 identical with that described above. The waste gas cooling means of FIG. 6 has slag catchers 122 and an additional burner 124, as schematically illustrated. From the receiving end 118 the waste gas will flow horizontally along the branch 126 to then flow upwardly through the vertical portion 128 of the cooling means 120 before reaching the upper horizontal branch 130 from which the waste gas flows to the filter, as schematically indicated in FIG. 6. This portion 130 may include a water spray means 132 which forms a water cooling means similar to the cooling means 48 and 90 described above for cooling the waste gas so that it will have a proper temperature for cleaning purposes. Thus this means 132 will simply be in the form of a suitable pipe communicating with the source of cooling water and having nozzles for spraying the water directly into the waste gas as it flows through the branch 130 to the filter.

With this embodiment the supply means 134 for supplying the materials to be pretreated by the waste gas takes the form of an endless conveyor 136 and intermittently operating charging device 138. This conveyor 136 may be used for continuously supplying materials through an inlet 140 to the right end of the branch 126. However, certain materials may have properties which make it advantageous to provide an intermittent supply by way of the movable pusher type of supply device 138. This may include a hydraulic piston and cylinder assembly 142 operating a pusher 144 which intermittently advances material deposited on a plate 146 to the left through a suitable inlet into the cooling means 120 just below the inlet 140 through which the material is continuously supplied. Thus, with the supply means 134 it is possible to have a continuous supply of certain materials by way of the conveyor 136 or an intermittent supply of other types of materials by way of the device 138, and these devices 136 and 138 may be used either separately or simultaneously so that certain constituents will be supplied intermittently while at the same time other constituents will be supplied continuously with an arrangement as shown schematically in FIG. 6.

When the material reaches the interior of the waste gas cooling means 120 at the right end of the branch 126 thereof, this material is received on an endless conveyor means 148 in the form of a suitable endless belt having the construction of a mesh fine enough to prevent the constituents from falling therethrough, although certain small impurities such as undesirable dust particles and the like can fall through to be received at an outlet 150. The conveyor means 148 will thus support the constituents to be treated and convey them to the left at a preselected rate according to the speed of drive of the conveyor means 148. This conveyor is driven from any suitable motor through any suitable speed control so as to control the rate of feed of the materials in the portion 126 of the waste gas cooling means 120. The materials can thus be delivered at a predetermined rate to the discharge means 152. This discharge means will have a suitable gate or other movable closure device which can be opened at the proper intervals so as to discharge the treated materials as required.

This particular embodiment is of special advantage in connection with the delivery of the treated materials to the vessel 12. The vessel 12 is tiltable between the solid line operating position and the dotted line charging position, as schematically represented in FIG. 6. When in the charging position the top open end of the vessel 12 is directly in line with an located adjacent to the discharge means 152. Therefore, during each off blow or nonoperating period of the vessel 12, the discharge means 152 can be opened so that the treated materials will flow directly out of the discharge means and into the vessel 12, thus eliminating the need for any transporting cars or the like for receiving the treated materials and immediately transporting them to the vessel of the furnace. Therefore with the arrangement of FIG. 6 a considerable advantage is achieved with respect to the labor and time involved in the operation as well as the amount of equipment which is required.

With this embodiment also it is possible to intensify the generation of heat at the material-treating region 126 of the waste gas cooling means 120. Thus this embodiment also includes an air supply means 154 in the form of a suitable pipe, duct, or the like, which delivers hot air to the pair of outlets 156. These outlets direct the hot air upwardly through the mesh conveyor belt so that not only is the generation of heat intensified but in addition the particulate material on the conveyor means 148 is subjected to a fluidizing action which greatly increases the area of exposure of the materials to the atmosphere of the waste gas.

In this case also the air supply means 154 has a branch 158 provided with a valve 160 which may be opened in order to direct the air through a preheater 162 situated in the vertical portion 128 of the waste gas cooling means 120. The preheated air is heated at the heater 162 by the waste gas itself, as pointed out above in connection with the air preheater 116 of FIG. 5. When the valve 160 is opened, the valve 164 is closed, so that now the air must flow through the preheater 162 to be received in the branch 166 for return to the outlets 156. In this case also it is possible to connect the branch 166 through a suitable connecting pipe, duct, or the like, provided with a suitable valve directly through the interior of the waste gas cooling means for providing as desired a recirculation of waste gas to a predetermined extent.

Figure 7:
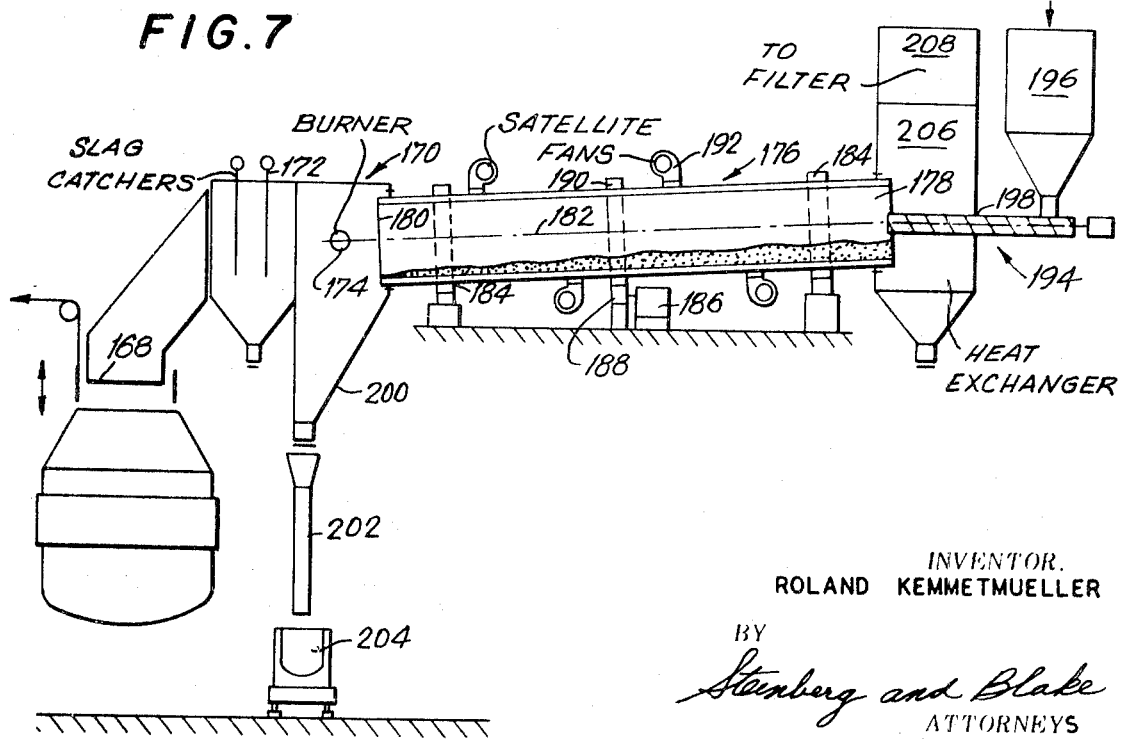
FIG. 7 is a schematic illustration of a still further embodiment of the method and apparatus according to the invention.

It is to be emphasized that although specific features have been referred to above, the invention is applicable to all types of installations which can have structures which differ very widely from each other. For example there is shown in FIG. 7 a method and apparatus of the invention according to which the vessel 12 has its top open end communicating with the receiving end 168 of a waste gas cooling means 170, with a closure ring forming in this case also an extension of the end 168 of the waste gas cooling means 170. This cooling means 170 includes the slag catchers 172 and has an additional burner 174.

However, the primary distinction of the embodiment of FIG. 7 over the other embodiment is that the waste gas cooling means 170 includes a rotary furnace 176. This rotary furnace has an open receiving end 178 for receiving the constituents which are to be pretreated before being added to the charge, and the rotary furnace 176 has an opposed outlet end 180. The rotary furnace 176 is supported for rotary movement about its axis 182 on suitable bearings 184 and is driven in rotation in any suitable way such as from a motor 186 which drives a pinion 188 which in turn meshes with a gear 190 fixed to and surrounding the rotary furnace 176. The rotary furnace carries satellite fans 192 driven from any suitable motors with electrical connections being provided through suitable sliprings, and these fans serve to enhance the flow of waste gas through the rotary furnace from the left toward the right, as viewed in FIG. 7, in countercurrent to the flow of the material to be treated, as will be apparent particularly from the description which follows.

In the embodiment of FIG. 7 the material supply means 194 includes the supply hopper 196 which delivers the materials to a screw feeder 198 the outlet end of which is situated partly within the receiving end 178 of the rotary furnace 176 so that the constituents to be treated are deposited within the receiving end of the rotary furnace to flow by gravity downwardly therealong in countercurrent to the flow of waste gas, with the rotary movement of the furnace providing an intimate exposure of the constituents to the waste gas. The treated material falling out through the outlet 180 of the rotary furnace 176 is received at the discharge means 200 which includes an outlet which may be opened or closed. When the outlet is open the material will fall through a tube 202 into a car 204 which immediately delivers the pretreated material to the vessel to form part of the charge thereof. The waste gas after flowing through the inlet 178 of the rotary furnace 176 flows upwardly through a portion 206 of the waste gas cooling means and then along a horizontal branch 208 to a filter. It is to be noted that since the screw feeder 198 extends transversely through the portion 206 of the waste gas cooling means to the left wall of the portion 206 which receives the receiving end 178 of the furnace 176, the exterior of the screw feeder 198 is exposed to heat in the portion 206. Thus this portion 206 forms a heat exchanger which will preheat the materials even before they reach the furnace 176 while they are fed by the screw feeder 198 through the portion 206 of the waste gas cooling means 170 of this embodiment. Thus the portion 206 is used as a heat exchanger to initially raise the temperature of the materials before they are even deposited in the rotary furnace 176, thus achieving an exceedingly economical and full use of the heat in the waste gas.

It is apparent, therefore, that with the method and installation of the invention use is made of the waste gas itself for placing constituents which are to be added to the charge in the best possible condition for use in the charge, so that the necessity of providing additional equipment, manpower, and controls are completely eliminated with the pretreating being carried out according to the method and apparatus of the invention in an exceedingly economical manner capable of greatly reducing the costs which otherwise would be required to achieve similar results.

What is claimed is:

1. In a method for operating a metallurgical furnace which has a waste gas cooler through which waste gas flows along a given path, the steps of directing selected materials through the waste gas cooler, to be treated by the gas therein, to a discharge location beyond said given path, and then transferring the thus treated material from said discharge location to the furnace as part of the charge for the furnace.

2. In a method as recited in claim 1, the step of controlling the waste gas in the cooler for controlling the treatment of the material subsequently used as part of the charge.

3. In a method as recited in claim 2 and wherein the step of controlling the waste gas includes the control of the temperature thereof for preheating the material to a controlled extent.

4. In a method as recited in claim 2 and including the step of controlling the composition of the waste gas in the cooler for controlling the treatment of the material directed therethrough.

5. In a method as recited in claim 1 and wherein the treated material is continuously fed through the cooler.

6. In a method as recited in claim 1 and wherein the treated material is intermittently fed through the cooler.

7. In a method for operating a metallurgical furnace which has a waste gas cooler, the steps of directing selected material through the waste gas cooler, to be treated by the gas therein, and then utilizing the thus treated material as part of the charge for the furnace, the treated material being directed through a predetermined portion of the cooler, and including the step of supplying to the interior of the cooler upstream of said predetermined portion thereof a carbonaceous particulate material which reacts with the oxygen in the hot waste gas to increase the carbon monoxide content of the waste gas atmosphere at said predetermined portion of the cooler.

8. In a method as recited in claim 7, the step of electrically heating the carbonaceous particulate material.

9. In a method as recited in claim 1 and wherein the waste gas contains carbon monoxide, the step of feeding combustion air to the interior of the cooler for controlling the temperature of the waste gas atmosphere through which the treated material is directed.

10. In a method as recited in claim 1 and wherein the furnace is intermittently operated, the step of continuously directing the treated material through the cooler and adding to the interior thereof combustible materials which are burned within the cooler for maintaining therein while the furnace operates as well as while it is not operating a temperature suitable for continuous treatment of the treated materials.

11. In method as recited in claim 1 and wherein the treated material is at least preheated by the waste gas, the step of feeding hot air to the interior of the cooler at the region thereof through which the treated material is directed for intensifying the development of heat at the latter region.

12. In a method as recited in claim 11, the step of heating the air in a heat exchanger utilizing heat of the waste gas itself.

13. In a method as recited in claim 11 and wherein the heated air delivered to the cooler is heated from a source outside of the cooler.

14. In a method for operating a metallurgical furnace which has a waste gas cooler, the steps of directing selected material through the waste gas cooler, to be treated by the gas therein, and then utilizing the thus treated material as part of the charge for the furnace, and including the step of recirculating part of the waste gas through the cooler for maintaining therein an atmosphere suitable for treatment of the material directed therethrough.

15. In a method for operating a metallurgical furnace which has a waste gas cooler, the steps of directing selected material through the waste gas cooler to be treated by the gas therein, and then utilizing the thus treated material as part of the charge for the furnace, and including the step of cooling the waste gas within the cooler for providing for the waste gas a temperature suitable for cleaning thereof.

16. In a method as recited in claim 15, the step of spraying water into the interior of the cooler for cooling the waste gas therein.

17. In a method as recited in claim 1, the step of alternately operating a pair of furnaces with which a single waste gas cooler communicates for maintaining first from one furnace and then from the other a given waste gas atmosphere in the cooler.

18. In a method as recited in claim 1, the step of feeding the treated material directly from the discharge location into the furnace.

19. In a metallurgical furnace installation, a vessel in which metallurgical operations are carried out with development of waste gas which flows from the vessel, waste gas cooling means communicating with the vessel for receiving therefrom the waste gas which flows along a given path in said cooling means and for cooling the waste gas while the latter flows through said cooling means along said driven path, supply means communicating with said cooling means for supplying to the interior thereof materials to be treated by the waste gas therein, and discharge means communicating with said cooling means for discharging the treated materials therefrom, said discharge means being situated at a location beyond said given path of waste gas flow.

20. The combination of claim 19 and wherein said supply means communicates with an upper part of said cooling means for delivering to the interior thereof materials which fall downwardly in the cooling means, said discharge means communicating with said cooling means at a part thereof situated beneath the part with which said supply means communicates, so that the materials fall downwardly to the discharge means to be received thereby for discharge out of the cooling means after treatment by the waste gas therein.

21. In a metallurgical furnace installation, a vessel in which metallurgical operations are carried out with development of waste gas which flows from the vessel, waste gas cooling means communicating with the vessel for receiving the waste gas therefrom and cooling the waste gas while the latter flows through said cooling means, supply means communicating with said cooling means for supplying to the interior thereof materials to be treated by the waste gas therein, and discharge means communicating with said cooling means for discharging the treated materials therefrom, said supply means communicating with an upper part of said cooling means for delivering to the interior thereof materials which fall downwardly in the cooling means, said discharge means communicating with said cooling means at a part thereof situated beneath the part with which said supply means communicates, so that the materials fall downwardly to the discharge means to be received thereby for discharge out of the cooling means after treatment by the waste gas therein, a second supply means communicating with the interior of said cooling means at a location upstream of the part with which said first-named supply means communicates for supplying a carbonaceous particulate material to the interior of the cooling means for increasing the carbon monoxide content of the waste gas which treats the material supplied by said first-named supply means.

22. The combination of claim 21 and wherein an electrode means communicates with the interior of said cooling means at the location which receives the carbonaceous material from said second supply means for heating the carbonaceous material in the cooling means.

23. In a metallurgical furnace installation, a vessel in which metallurgical operations are carried out with development of waste gas flows from the vessel, waste gas cooling means communicating with the vessel for receiving the waste gas therefrom and cooling the waste gas while the latter flows through said cooling means, supply means communicating with said cooling means for supplying to the interior thereof materials to be treated by the waste gas therein, and discharge means communicating with said cooling means for discharging the treated materials therefrom, and a water supply means communicating with the interior of said cooling means for spraying cooling water into the latter.

24. The combination of claim 19 and wherein said cooling means has a waste gas receiving end located directly next to said vessel for receiving waste gas directly therefrom with minimum heat loss.

25. The combination of claim 19 and wherein a burner means communicates with the interior of said cooling means for maintaining the waste gas at a predetermined temperature.

26. The combination of claim 19 and wherein a pair of said vessels both communicate with said waste gas cooling means for alternately supplying the latter with waste gas.

27. The combination of claim 19 and wherein an air supply means communicates with said cooling means for supplying air thereto.

28. The combination of claim 27 and wherein a heat exchanger means communicates with said cooling means and with said air supply means for deriving from the waste gas itself heat for heating air supplied through said air supply means.

29. The combination of claim 19 and wherein a conveyor means is situated within said cooling means and extends between said supply and discharge means for conveying the material supplied by said supply means from the latter to said discharge means.

30. The combination of claim 19 and wherein said discharge means is located adjacent said vessel, said vessel being tiltable between an operating position communicating with said cooling means and a charging position communicating with said discharge means for receiving treated material directly therefrom.

31. In a metallurgical furnace installation, a vessel in which metallurgical operations are carried out with development of waste gas which flows from the vessel, waste gas cooling means communicating with the vessel for receiving the waste gas therefrom and cooling the waste gas while the latter flows through said cooling means, supply means communicating with said cooling means for supplying to the interior thereof materials to be treated by the waste gas therein, and discharge means communicating with said cooling means for discharging the treated materials therefrom, said cooling means including a rotary furnace through which waste gas flows, said supply means communicating with one end of said rotary furnace for supplying material thereto and said discharge means communicating with an opposite end of said rotary furnace for receiving treated material therefrom.

32. The combination of claim 19 and wherein said supply means continuously supplies material to the interior of said cooling means.

33. The combination of claim 19 and wherein said supply means intermittently supplies material to the interior of said cooling means.

34. The combination of claim 19 and wherein said cooling means provides a substantially horizontal path of flow for waste gas, and supply means directing material supplied thereby transversely across the waste gas in the substantially vertical direction.

35. The combination of claim 19 and wherein said supply means and discharge means are situated for directing the material supplied by said supply means to said discharge means in countercurrent to the flow of waste gas through said cooling means.

36. In a metallurgical furnace installation, a vessel in which metallurgical operations are carried out with development of waste gas which flows from the vessel, waste gas cooling means communicating with the vessel for receiving the waste gas therefrom and cooling the waste gas while the latter flows through said cooling means, supply means communicating with said cooling means for supplying to the interior thereof materials to be treated by the waste gas therein, and discharge means communicating with said cooling means for discharging the treated materials therefrom, said supply means and discharge means being situated for directing the material supplied by said supply means to said discharge means in countercurrent to the flow of waste gas through said cooling means, said cooling means including an elongated vertical portion having water-cooled walls defining a passage through which the waste gas flows in an upward direction, said supply means providing materials to be treated to said vertical portion of said waste gas cooling means at an upper part thereof so that the material falls down through said vertical portion in countercurrent to the upwardly flowing waste gas, and said discharge means being located at a lower end of said vertical portion of said cooling means.

* * * * *